United States Patent
Wei et al.

(10) Patent No.: US 7,838,065 B2
(45) Date of Patent: Nov. 23, 2010

(54) METHOD FOR PREPARING AN ELECTRODE COMPRISING AN ELECTROCHEMICAL CATALYST LAYER THEREON

(75) Inventors: Tzu-Chien Wei, Hsinchu (TW);
Chi-Chao Wan, Hsinchu (TW);
Yeng-Yun Wang, Hsinchu (TW);
Hui-Hsiu Tang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 649 days.

(21) Appl. No.: 11/715,426

(22) Filed: Mar. 8, 2007

(65) Prior Publication Data
US 2008/0063788 A1    Mar. 13, 2008

(30) Foreign Application Priority Data
Sep. 8, 2006    (TW) .............................. 95133163 A (51) Int. Cl.
*B05D 5/12*    (2006.01)
(52) U.S. Cl. ............................ 427/123; 427/58; 427/74; 427/124; 427/304
(58) Field of Classification Search ........................ None
See application file for complete search history.

(56) References Cited

PUBLICATIONS

N. Papageorgiou, "Counter-electrode function in nanocrystalline photoelectrochemical cell configurations", Coordination Chemistry Reviews 248 (2004) 1421-1446.
Anneke Hauch et al., "Diffusion in the electrolyte and charge-transfer reaction at the platinum electrode in dye-sensitized solar cells", Electrochimica acta 46 (2001) 3457-3466.
Md. K. Nazeeruddin et al., "Investigation of Sensitizer Adsorption and the Influence of Protons on Current and Voltage of a Dye-Sensitized Nanocrystalline $TiO_2$ Solar Cell", J. Phys. Chem. B 2003, 107, 8981-8987.
C. Wei et al., "Poly(N-vinyl-2-pyrrolidone)-capped platinum nanoclusters on indium-tin oxide glass as counterelectrode for dye-sensitized solar cells", Applied Physics Letters 88, 103122 (2006).
Hidefumi Hirai et al., "Protecting Polymers in Suspension of Metal Nanoparticles", Polym. Adv. Technol. 12, 724-733 (2001).
Guiqiang Wang et al., "X-ray photoelectron spectroscopy analysis of the stability of platinized catalytic electrodes in dye-sensitized solar cells", Surf. Interface Anal. 2004; 36: 1437-1440.
Tzu-Chien Wei et al., "Immobilization of Poly(N-vinyl-2-pyrrolidone)-Capped Platinum Nanoclusters on Indium-Tin Oxide Glass and Its Application in Dye-Sensitized Solar Cells", J. Phys. Chem. C 2007,111. 4847-4853.

*Primary Examiner*—Timothy H Meeks
*Assistant Examiner*—Collette Ripple
(74) *Attorney, Agent, or Firm*—Bacon & Thomas, PLLC

(57) ABSTRACT

Disclosed is a method for preparing an electrode having an electrochemical catalyst layer, comprising the steps of: providing a substrate having a conductive layer thereon, immersing the substrate in a first solution having a conditioner to form a conditioner layer on the surface of the conductive layer, and immersing the substrate in a second solution having polymer-capped noble metal nanoclusters to form an electrochemical catalyst layer on the conditioner layer of the substrate. This method can reduce the amount of noble metal used in the electrochemical catalyst layer and is suitable for mass production.

23 Claims, 5 Drawing Sheets

METHOD FOR PREPARING AN ELECTRODE COMPRISING AN ELECTROCHEMICAL CATALYST LAYER THEREON

TECHNICAL FIELD

The present invention relates to a method for preparing an electrode comprising an electrochemical catalyst layer. More particularly, the present invention relates to a method for preparing an electrode comprising an electrochemical catalyst layer formed by polymer-capped nanoclusters.

BACKGROUND ART

Figure 1:
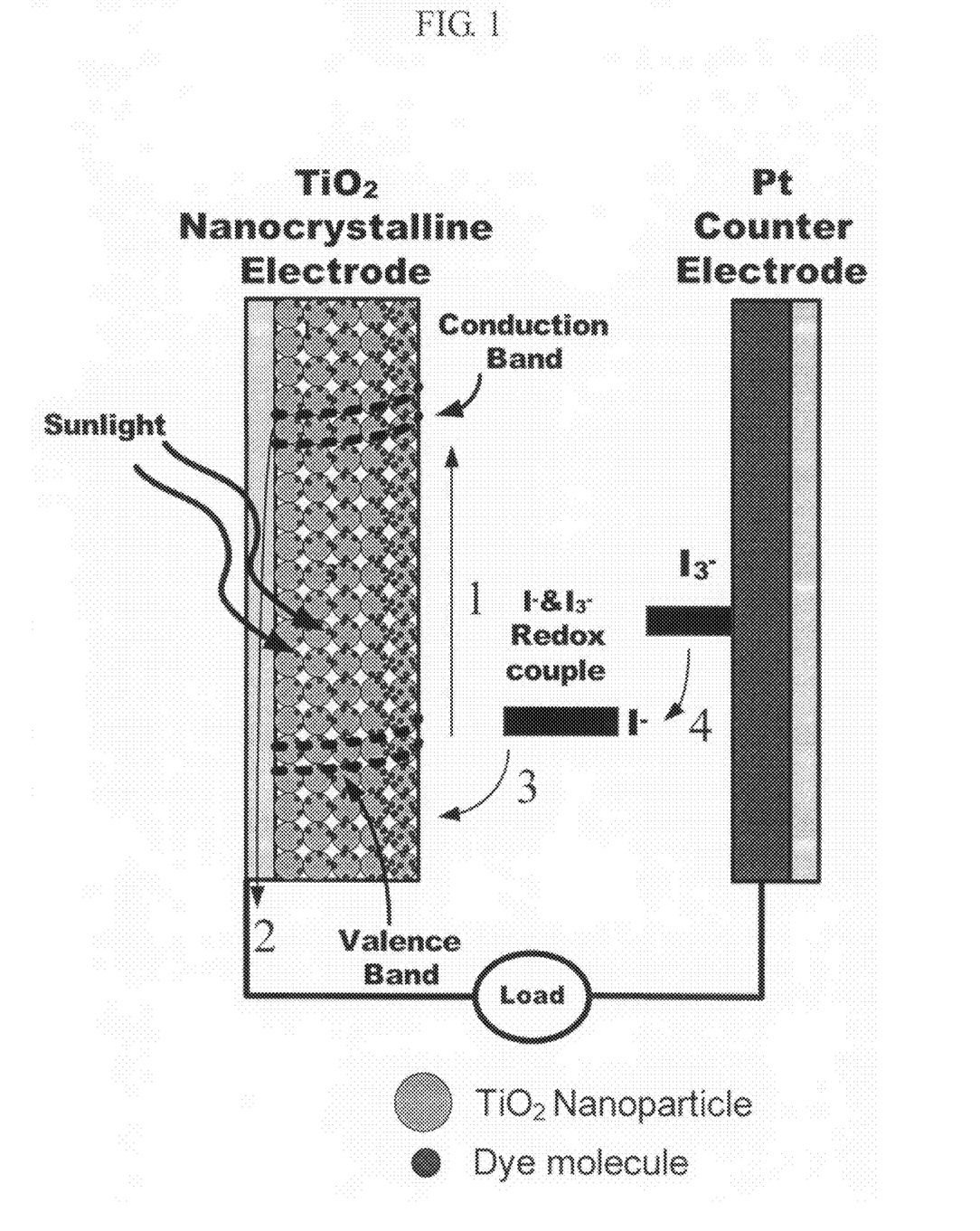
FIG. 1 is a schematic view showing the working principle of a conventional DSSC.

Recently, the dye-sensitized solar cell (DSSC) has been attracting much attention as a potentially low-cost energy device. Typically, a DSSC consists of a dye-sensitized nanocrystalline semiconductor film on ITO (Indium-tin oxide) or FTO (fluorine-doped tin oxide) glass as the photo-anode, a platinized counter electrode which serves as the cathode, and an iodide/tri-iodide redox couple in proper mediator as the electrolyte. The working principle of a DSSC is summarized in five steps below, as shown in FIG. 1:

(1) Photo-excitation on dye molecules induces charge separation (see arrow 1 in FIG. 1).
(2) Charge (electron) injects into conduction band of mesoporous $TiO_2$.
(3) Charge passes through outer circuit via electronic load (see arrow 2 in FIG. 1).
(4) Dye reduces to ground state by redox couple in the electrolyte (see arrow 3 in FIG. 1).
(5) Redox couple reduces on counter electrode by the charge coming from outer circuit (see arrow 4 in FIG. 1).

In a DSSC, the counter electrode functions as reduction reaction site such as:

This reduction reaction is vital since iodide ions are responsible for the regeneration of oxidized dye molecules. Once the dye regeneration can not catch up the dye oxidation (i.e. electron injection from dye molecule to CB of $TiO_2$), whole conversion efficiency is obstructed and DSSC itself might deteriorate because iodine crystal may deposit on the counter electrode surface.

In the prior arts, the naked ITO or FTO glass shows extremely slow kinetics of tri-iodide reduction in organic solvents. In order to minimize the overpotential, catalyst material is deposited on ITO or FTO glass to speed up the reaction.

So far platinum (Pt) has been used almost exclusively as the catalyst material. However there are different methods to form a thin layer of Pt, the choice of which depends on the cost and efficiency.

Sputtering a thin layer of Pt on ITO or FTO is a method commonly used. This platinized electrode exhibits fair performance. However sputtering requires an ultra-high vacuum environment and is not suitable for mass production.

Papageorgiou et al. developed a method called "thermal cluster platinum catalyst" (Coord. Chem. Rev., 2004, 248, pp 1421). This method provides low Pt loading (about 2-10 µg/cm$^2$), superior kinetic performance (charge-transfer resistance, $R_{CT}$<0.1 Ωcm$^2$), and mechanical stability with respect to conventional platinum deposition methods like sputtering, or electrochemical deposition.

Wang et al. (Surf. Interface Anal., 2004, 36, pp 1437) studied the stability of thermal cluster Pt (TCP) electrode by X-ray photoelectron spectroscopy; they found the electrochemical-catalytic performance of TCP might reduce slightly due to adsorbed iodide on TCP's surface and the electrochemical catalytic performance could be regenerated by reheating treatment. However, this method requires heating up to 380° C., which is not suitable for mass production.

Other materials such as carbon and conducting polymer were also proposed to be the catalyst for tri-iodide reaction in DSSC; these new materials usually require thicker porous films to be deposited on the substrate to obtain acceptable catalytic effect and are still being developed.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Therefore, the present invention has been made in view of the above-mentioned problems. It has been found that when a noble metal catalyst layer is used in an electrode for electrochemical devices, the amount of noble metal contained in the catalyst layer affects the cost of the whole cell deeply, especially in the field of fuel cells and solar cells. Therefore, a method has been developed to reduce the amount of noble metal used in the electrochemical catalyst layer and to suit mass production.

It is an object of the present invention to provide a method for preparing an electrode having an electrochemical catalyst layer formed by polymer-capped noble metal nanoclusters, and a method for manufacturing an electrochemical device comprising the same electrode. This electrochemical catalyst layer is bound to a conductive layer of an electrode through a surfactant. Due to the presence of the polymer in the electrochemical catalyst layer of the electrode, the amount of noble metal contained in the catalyst layer can be reduced and also the noble metal can be bound to the electrode during the process.

According to an aspect of the present invention, there is provided a method for preparing an electrode having an electrochemical catalyst layer, comprising the steps of: providing a substrate having a conductive layer thereon, immersing the substrate in a first solution having a conditioner to form a conditioner layer on the surface of the conductive layer, and immersing the substrate in a second solution having polymer-capped noble metal nanoclusters dispersed therein, wherein the conditioner layer attracts the polymer-capped noble metal nanoclusters to form a polymer-protected electrochemical catalyst layer on the conditioner layer of the substrate.

According to another aspect of the present invention, there is provided an electrochemical device having the above electrode, comprising a cathode, an anode, a sealing layer sandwiched between the cathode and the anode, and an electrolyte, wherein either or both of the electrodes has the aforementioned electrochemical catalyst layer. The electrode having the electrochemical catalyst layer comprises a conditioner layer formed on a surface of a conductive layer of the electrode; meanwhile, the conditioner layer grabs a plurality of polymer-capped noble metal nanoclusters. These noble metal nanoclusters serve as the electrochemical catalyst layer of the electrode, especially for a DSSC.

According to another aspect of the present invention, there is provided a method for manufacturing an electrochemical device with an electrode having an electrochemical catalyst layer, comprising the steps of: laminating a first electrode and a second electrode by a sealing layer, and injecting an electrolyte into a gap between the first electrode and the second electrode through an inlet. Herein, at least one of the first electrode and the second electrode is formed by the steps of providing a substrate having a conductive layer thereon, immersing the substrate in a first solution having a conditioner to form a conditioner layer on the surface of the conductive layer, and then immersing the substrate in a second solution having polymer-capped noble metal nanoclusters dispersed therein, wherein the conditioner layer on the substrate attracts the polymer-capped noble metal nanoclusters to form a polymer-protected electrochemical catalyst layer on the conditioner layer of the substrate.

Hereinafter, the present invention will be explained in more detail.

The present invention is characterized by using polymer-capped noble metal nanoclusters to form an electrochemical catalyst layer for an electrochemical device with two simple immersions. The preliminary electrode according to the present invention may be manufactured by a conventional process known to one skilled in the art, and then the electrode is immersed twice to form a conditioner layer and a polymer-capped noble metal catalyst layer, respectively.

Figure 2A:
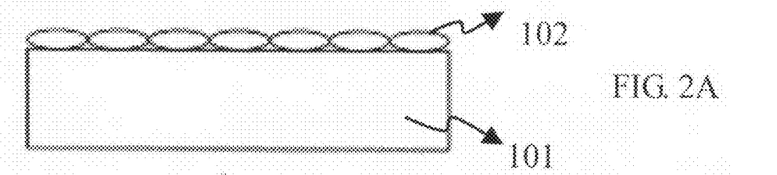
FIG. 2A to FIG. 2E are views illustrating a method for manufacturing an electrode having an electrochemical catalyst layer according to the present invention.
Figure 2B:
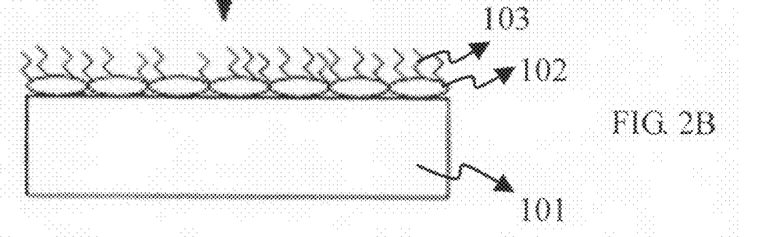
Figure 2C:
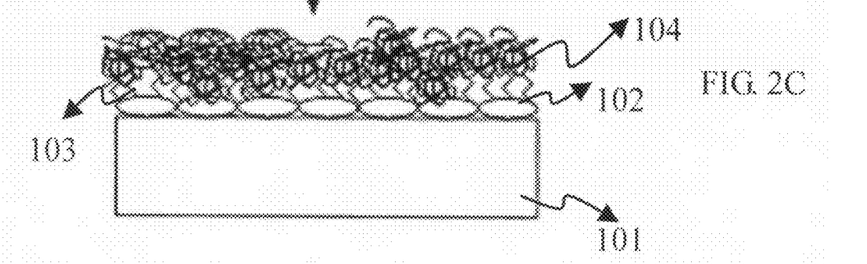

The method for manufacturing an electrode having an electrochemical catalyst layer according to the present invention is shown in FIGS. 2A to 2C. Firstly, a substrate 101 is provided, as shown in FIG. 2A. The material of the substrate 101 is not limited, but it is more preferable to use glass or plastic for an electrode of the solar cell. A conductive layer 102 for transferring charges is formed on the surface of the substrate 101. Non-limiting examples of the conductive layer 102 include ITO glass, graphite, and metal, such as nickel and stainless steel. Although there is no particular limitation in methods for forming the conductive layer, conventional methods known to those skilled in the art, including a sputtering method, an evaporation method and a coating method, may be used.

Afterwards the substrate 101 is immersed in a first solution containing surfactant material to form a conditioner layer 103 on the surface of the conductive layer (refer to FIG. 2B). Preferably, the conditioner layer 103 is a cationic surfactant, and for example, quaternary ammonium salt may be used with no particular limitation. The function of the conditioner layer 103 is to change the surface charge state in order to improve the adhesion between the conductive layer 102 and a succeeding film.

Subsequently, FIG. 2C shows that the substrate 101 is immersed in a second solution which contains polymer-capped noble metal nanoclusters dispersed therein. The conditioner layer 103 on the substrate 101 attaches the polymer-capped noble metal nanoclusters to form a noble metal catalyst layer on the surface of the conditioner layer 103.

The second solution may be initially prepared to provide a polymer solution capable of capping the noble metal, followed by adding the precursor of the noble metal salt. Preferably, the polymer solution is PVP, poly(acrylamide) (PAM), poly(vinyl alcohol) (PVAL), poly(acrylic acid) (PAA), poly(ethyleneimine) (PEI) or the like and the noble metal of the precursor is selected from the group consisting of palladium, platinum, ruthenium, silver, and gold. Any noble metal which can serve as a catalyst in a reduction reaction may be used with no particular limitation. The reductant for the precursors finally is introduced in the polymer solution comprising the noble metal salt, and therefore the noble metal salt is reduced to the noble metal nanoclusters capped by the polymer. Herein the nano-clusters of the noble metal are dispersed uniformly in the above solution. When the substrate 101 is immersed in the second solution, an electrochemical catalyst layer formed by polymer-capped nanoclusters of the noble metal is uniformly distributed on the substrate 101. The method for preparing the solution comprising polymer-capped metal was described in detail by Hidefumi Hirai et al. in Polymers for Advanced Technologies (12, pp 724~733), published in 2001, entitled "Protecting polymers in suspension of metal nanoparticles", which is hereby incorporated by reference in its entirety.

The solvent for the second solution may be used with no particular limitation. Preferably, the solvent has solubility with polymer and a low boiling point.

It is to be noted that the mixing ratio in the second solution according to the present invention on the weight basis, i.e., the weight of polymer (PW) to the weight of noble metal (MW) is 0.5~6. If the amount of the polymer in the second solution is not enough, the stable suspension cannot be achieved and a settling phenomenon may occur. On the other hand, if the amount of the polymer in the second solution is excessive, the noble metal can not work well and then the efficiency of the catalyst would be decreased. The detail will be described in the following embodiments.

It is preferable that the immersion temperature for the substrate 101 in the second solution is lower than 50° C., and more preferably is room temperature. It is not necessary for the electrode comprising an electrochemical catalyst layer according to the present invention to be subjected to high temperature process, which affects the sheet resistance of the conductive layer 102 on the substrate 101. The cell performance can be well controlled and the introduction of the simplified operations and equipment reduces the manufacturing cost.

Figure 2D:
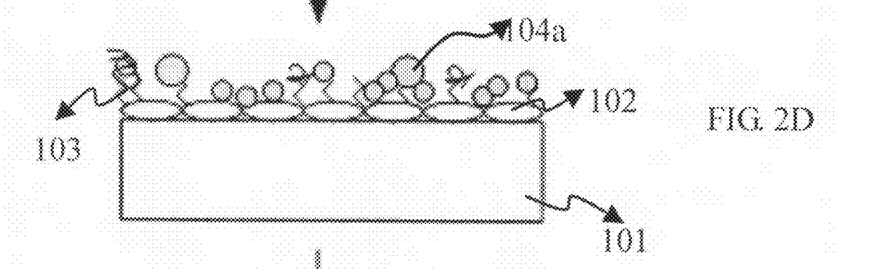
Figure 2E:
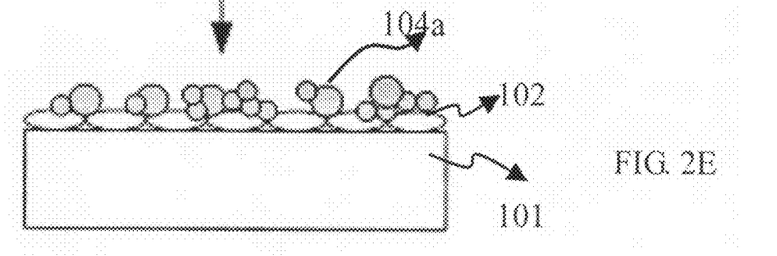

The size of the noble metal nanoclusters in the electrochemical catalyst layer according to the present invention can be obtained through the steps shown in FIGS. 2D to 2E, wherein the electrode shown in FIG. 2C is treated by heating at a temperature of up to 300° C. for about 5 mins, meanwhile the polymer cleavage in the electrochemical catalyst layer occurs to make the noble metal nanoclusters exposed. Therefore the size of the noble metal nanoclusters, about 10~50 nm, can be measured.

The electrode can be further heated at a temperature of up to 300° C. for about 5 mins, and both the polymer and the surfactant material on the substrate 101 may disappear due to the cleavage resulting from the heating. The island-like noble metal nanoclusters are left on the conductive layer 102 of the substrate.

Figure 3:
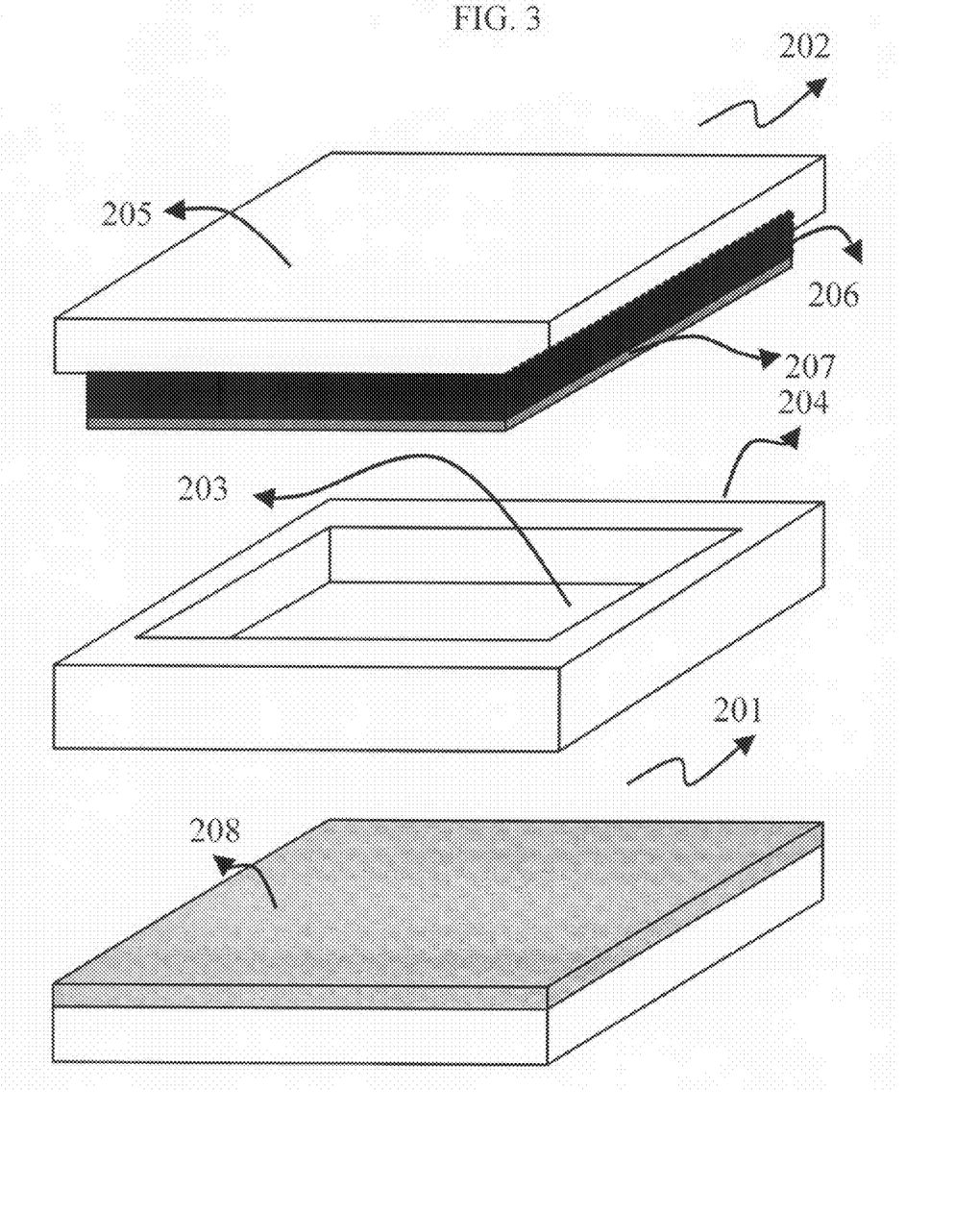
FIG. 3 is a three-dimensional exploded view showing an electrochemical device manufactured by the method according to the present invention.

Furthermore, the electrochemical device according to the present invention is shown in FIG. 3 with a perspective exploded view, comprising a cathode 201, an anode 202, a sealing layer 204 sandwiched between the cathode 201 and the anode 202, and an electrolyte (filling in a hollow 203 of the sealing layer 204), wherein either or both of the electrodes (i.e. the cathode 201 and the anode 202) has the electrochemical catalyst layer 208 manufactured by the aforementioned method. In other words, the electrode comprises a conductive layer formed on a surface of a substrate, a conditioner layer formed on a surface of the conductive layer, and a plurality of polymer-capped noble metal nanoclusters grabbed by the conditioner layer which serves as an electrochemical catalyst layer 208 of the electrode.

Herein, the electrode comprising an electrochemical catalyst layer according to the present invention may be either a cathode or an anode, preferably a cathode.

When the electrochemical device according to the present invention is a DSSC, the anode of the DSSC (i.e. the electrode without the electrochemical catalyst layer) preferably comprises a transparent conductive glass 205 on a substrate. Non-limiting examples of the transparent conductive glass 205 include indium tin oxide (ITO), fluorine doped tin oxide (FTO), antimony doped tin oxide (ATO), aluminum doped zinc oxide (AZO), gallium-doped zinc oxide (GZO), or indium zinc oxide (IZO). The anode of the DSSC commonly further comprises a $TiO_2$ layer 206 formed on the surface of the transparent conductive glass 205, wherein the $TiO_2$ layer 206 has dye 207 near the surface thereof. The anode of the DSSC according to the present invention may be manufactured by a conventional method known to those skilled in the art.

The dye used in the DSSC according to the present invention may be represented by the following Formula 1, Formula 2, Formula 3, or Formula 4, but is not limited thereto:

Also, Nazeeruddin et al. studied the property and structure of dye published in the Journal of Physical Chemistry B in 2003, entitled "Investigation of Sensitizer Adsorption and the Influence of Protons on Current and Voltage of a Dye-Sensitized Nanocrystalline $TiO_2$ Solar Cell" (107, pp 8981), which is hereby incorporated by reference in its entirety.

The electrode in the electrochemical device according to the present invention having an electrochemical catalyst layer manufactured by the above mentioned method comprises a conductive layer selected from the group consisting of ITO glass, graphite, and metal, such as nickel and stainless steel.

In the electrochemical device according to the present invention, the polymer contained in the electrochemical catalyst layer of the electrode is PVP, poly(acrylamide) (PAM), poly(vinyl alcohol) (PVAL), poly(acrylic acid) (PAA), poly(ethyleneimine) (PEI) or the like and the noble metal capped by the polymer is selected from the group consisting of palladium, platinum, ruthenium, silver, and gold.

In the electrochemical device according to the present invention, the surfactant material between the conductive layer and the polymer-capped noble metal is preferably a cationic surfactant, which makes the polymer-capped noble metal with the negative charge adsorbed on the substrate.

In the method of manufacturing the electrochemical device according to the present invention, the weight of polymer to the weight of noble metal in the second solution preferably is 0.5~6 and the size of the noble metal nanoclusters preferably is 10~50 nm.

Herein, the electrochemical devices include all types of devices in which electrochemical reactions are performed. Particular examples of the electrochemical devices include all kinds of fuel cells or solar cells.

The electrochemical device may be manufactured according to a conventional method known to one skilled in the art. In one embodiment, the method includes the steps of: laminating the first electrode and second electrode by means of an adhesive (i.e. a sealing layer), injecting an electrolyte into the gap between the first electrode and the second electrode through an inlet and sealing the inlet, wherein one of the electrodes is made by the above-described method according to the present invention.

More particularly, the suitable time for injecting the electrolyte into the electrochemical device depends on the desired quality of the electrochemical device and the manufacturing process for the final desired product. In other words, the electrolyte may be injected into the electrochemical device during the assembly of the electrochemical device or at the final step of the assembly.

Although there is no particular limitation in material for the sealing layer, it is preferable that the sealing layer is polymer film capable of performing a thermal condensation in a low temperature.

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

Manufacture of an Electrode Comprising an Electrochemical Catalyst Layer and a Solar Cell Using the Electrode

(Manufacture of a Cathode/a Counter Electrode)

PVP-capped Pt nanoclusters are synthesized by the following procedure: 0.1 grams Poly(N-vinyl-2-pyrrolidone (PVP) (MW=8000) was dissolved in 44 ml de-ionized water at room temperature in a beaker with stirring. $H_2PtCl_6$ (0.2 grams) as precursor, was added in the prepared PVP solution, and therefore the weight of polymer (PW) to the weight of noble metal (MW) was about 1.1. Then, 5 ml reductant (0.5M $NaBH_4$ solution) was added slowly to the beaker. The solution quickly changed from yellowish to black, indicating the formation of Pt nanoclusters. The whole procedure was done at room temperature within 30 mins.

A clean ITO glass plate (20 Ω/□) was immersed in a tank containing 1% conditioner ML-371 (available from Rockwood Electrochemicals Asia Ltd.) at 60° C. for 5 minutes. The conditioner is commonly used in printed circuit board (PCB) industry as the grafting agent. The conditioner is capable of changing the surface charge state of the ITO glass and makes the surface thereof positive charged. After rinsing with de-ionized water, the conditioned ITO glass was then immersed in the PVP-capped Pt suspension for 5 minutes. The negative charged PVP-capped Pt nanoclusters were adsorbed on the ITO glass and then an electrochemical catalyst layer was formed on the conditioned ITO glass. Finally the glass plate was rinsed with de-ionized water again and dried in air.

(Manufacture of an Anode/a Working Electrode)

0.036 grams dye N-719 (available from Solaronix) represented by the following Formula 2, was dissolved in a solution containing acetonitrile, t-butanol, and ethanol with the volumetric ratio 2:1:1 (50 ml, 25 ml, 25 ml) to provide a dye solution in a concentration of 3 mM.

[Formula 2]

N719

A $TiO_2$/ITO glass plate (available from Dyesol Ltd. in Australia) was cut into 2 cm×2 cm with a $TiO_2$ film having a surface area 0.5 cm×0.5 cm. Next, the $TiO_2$/ITO glass plate was heated at 550° C. for 10 minutes to improve the interconnection within the ITO film. The $TiO_2$/ITO glass plate was immersed in dye solution at 40° C. for 1 hour with stirring. After dye impregnation was performed, the electrode was removed from the dye solution and then was rinsed in acetonitrile.

(Cell Assembling)

Cell assembling procedure includes laminating the cathode and the anode obtained above with a 25 μm-thick thermoplastic hot-melt sealing sheet (SX-1170-25, available from Solaronix) in between to provide the laminated cell and curing at 100° C. to provide a sealed cell. Herein, a hollow is predetermined in the hot-melt sealing sheet for filling with an electrolyte. The electrolyte containing 0.6M DMPII (1-propyl-2,3-dimethylimidazolium iodide), 0.1M LiI (lithium iodide), 0.05M iodine and 0.5M TBP (4-tert-butylpyridine) in MPN (3-methoxypropionitrile) was then injected into the hollow between the cathode and the anode in the above sealed cell to provide a DSSC.

EXAMPLE 2

Manufacture of an Electrode Comprising an Electrochemical Catalyst Layer and a Solar Cell Using the Electrode A DSSC was provided in the same manner as described in Example 1, except that the amounts of the PVP and $H_2PtCl_6$ used in PVP-capped Pt suspension for manufacturing the cathode are 0.5 g and 0.2 g, respectively.

EXAMPLE 3

Manufacture of an Electrode Comprising an Electrochemical Catalyst Layer and a Solar Cell Using the Electrode A DSSC was provided in the same manner as described in Example 1, except that the amounts of the PVP and $H_2PtCl_6$ used in PVP-capped Pt suspension for manufacturing the cathode are 2 g and 0.2 g, respectively.

COMPARATIVE EXAMPLE 1

Manufacture of an Electrode Comprising an Electrochemical Catalyst Layer by a Conventional Method and a Solar Cell Using the Electrode A DSSC was provided in the same manner as described in Example 1, except that the electrochemical catalyst layer of the cathode is obtained by a conventional sputtering method. Namely, the method for manufacturing a cathode comprises depositing a thin Pt layer on a clean ITO glass plate (20 Ω/□) through a sputtering process to a thickness of at least 100 nm.

EXPERIMENTAL EXAMPLE 1

Analysis of Surface Morphology and Platinum Loading on an Electrochemical Catalyst Layer on an Electrode The following test is used to analyze the electrochemical catalyst layer on the electrode according to the present invention.

The sample electrode obtained from Example 2 is tested, whereas the one made of conventional method obtained from Comparative Example 1 is also tested as a reference.

An inductively coupled plasma-atomic emission spectroscopy (ICP-AES) is used to analyze the unit platinum loading on the electrode. The platinum loading of Example 2 according to the present invention is 4.89 μg/cm$^2$, whereas that of 100 nm-thick platinum layer in the Comparative Example 1 is 200 μg/cm$^2$. It is possible to form an ultrathin layer of PVP-capped Pt clusters deposited on ITO glass by performing the pretreatment conditioning step, which modified the ITO glass surface and improved adhesion between the PVP-capped Pt clusters and the substrate. Clearly, the method according to the present invention utilizes a smaller platinum amount than the conventional method.

Figure 4:
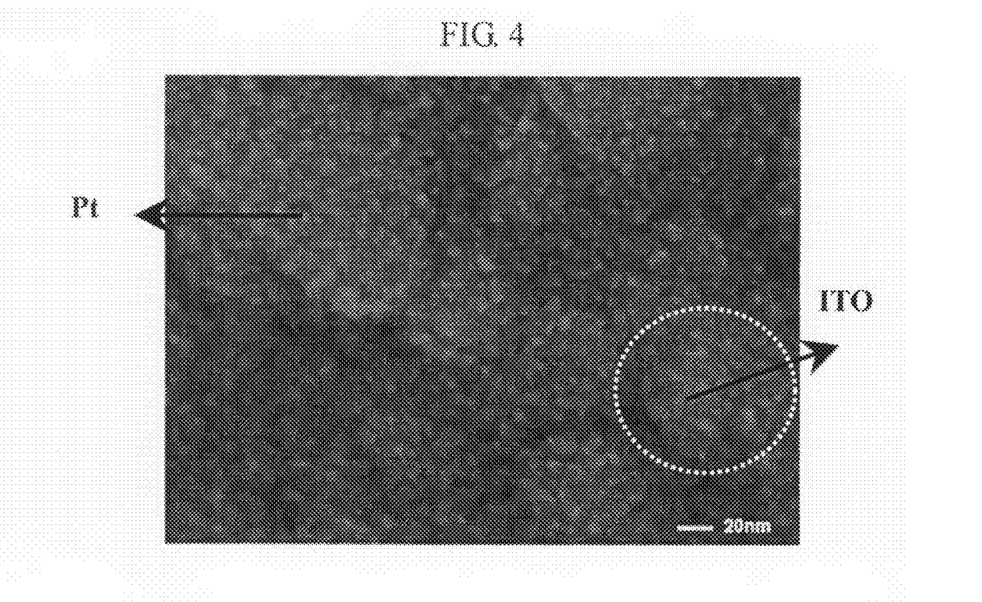
FIG. 4 is a photograph taken by a field emission scanning electron microscope of an electrochemical catalyst layer on the electrode used in Example 1.

A field emission scanning electron microscope (FESEM) is applied to study the microstructure of PVP-capped Pt on ITO glass. In order to observe Pt nanoclusters protected with PVP, the electrode is heated at 300° C. for 2 hours to remove the PVP and the conditioner before testing. A large amount of island-like Pt nanoclusters approximately 5-10 nm in diameter could be observed on the ITO substrate, as shown in FIG. 4, as could increase in the surface area of the electrochemical catalyst layer on the electrode according to the present invention.

EXPERIMENTAL EXAMPLE 2

Measurement of Catalytic Effect of the Electrode

The following test is used to evaluate the catalytic effect on tri-iodide reduction of the electrode according to the present invention. A symmetric testing cell is constructed highly similar to the one in Example 2 except for switching the anode with the cathode; in other words, the testing cell is made of two identical counter electrodes. Furthermore, the counter electrodes are identical to the ones made by the method in Example 2.

Figure 5:
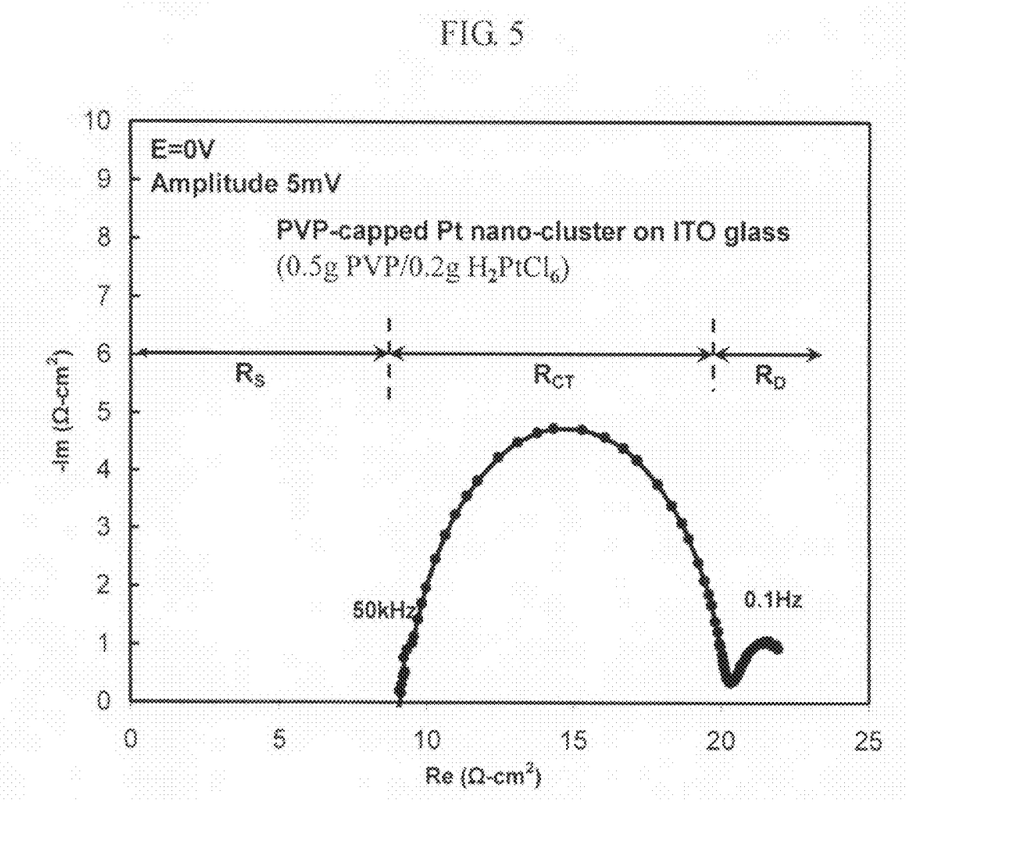
FIG. 5 is a graph showing a Nyquist plot for a symmetric testing cell constructed by two identical counter electrodes according to Example 1.

Electrochemical impedance spectroscopy (EIS) is performed by an AUTOLAB P10 potentiostat analyzer at the frequency ranging from 50 kHz to 0.1 Hz with 5 mV amplitude. The result is presented in FIG. 5, and three distinguishable impedances can be found in the Nyquist plot: series resistance (Rs), charge-transfer resistance ($R_{CT}$), and Nernst diffusion resistance ($R_D$). From FIG. 5, an $R_{CT}$ of 5.66 ohm*cm$^2$ can be deduced for a PVP-capped Pt electrode, which is an index of the catalytic performance of the Pt electrode. An $R_{CT}$ of 10.8 ohm*cm$^2$ is also measured for the symmetric testing cell in which counter electrodes are made by the method in Comparative Example 1. Therefore the electrochemical catalyst layer according to the present invention shows better catalytic effect than the ones made by conventional sputtering deposition.

EXPERIMENTAL EXAMPLE 3

Evaluation of Solar Cell Performance

Figure 6:
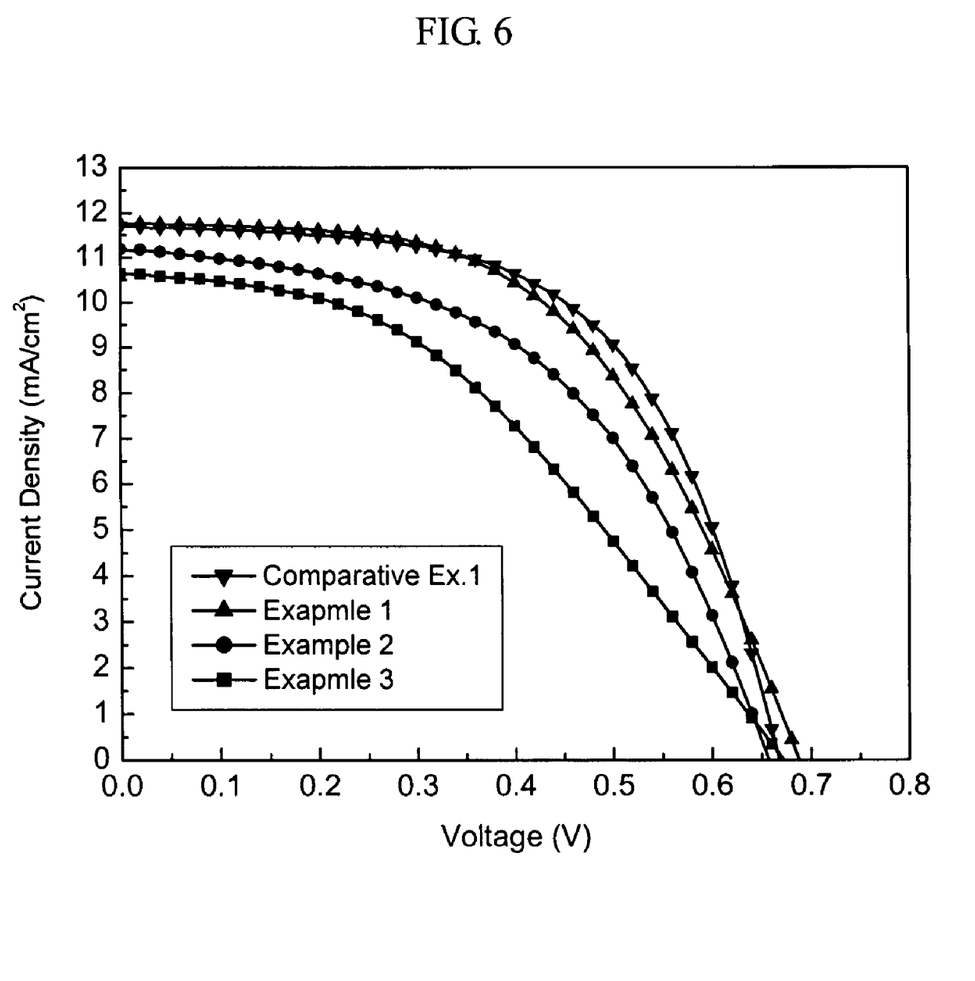
FIG. 6 is a graph showing variations in current density depending on the voltage for an electrochemical device according to Example 1, Example 2, Example 3, and Comparative Example 1.

The following test is used to evaluate the dye-sensitized solar cell (DSSC) performance employed with counter electrodes according to the present invention. An I-V curve measurement was performed by scanning DSSC from the open circuit voltage ($V_{OC}$) of the cell to the short circuit condition ($I_{SC}$) at 5 mV/S with an AUTOLAB P10 potentiostat under illumination by a Newport solar simulator (AM1.5, 100 mW/cm$^2$). The result is illustrated in FIG. 6, wherein the sample cells are made by the ones acquired in Example 1-3, and a comparative cell made by Comparative Example 1 is also tested as a reference. The results are shown in Table 1, wherein the FF represents fill factor, and ηeff is the overall conversion efficiency calculated based on equations 1 and 2 listed as follows:

$$FF = \frac{P_{MAX}}{V_{OC} \times I_{SC}} \quad \text{[Equation 1]}$$

Where $P_{MAX}$ is the maximum power during the scan, $V_{OC}$ is open circuit voltage and $I_{SC}$ is the short circuit current.

$$\eta_{eff} = \frac{P_{MAX}}{P_{IN}} = \frac{V_{OC} \times I_{SC} \times FF}{P_{IN}} \quad \text{[Equation 2]}$$

Where the $P_{IN}$ is the input power of solar simulator equal to 100 mW/cm$^2$.

From Table 1, it can be found that the cell employed with the electrode of Example 1 performs more than 90% in comparison to the sputtered electrode, and the conditioner layer and polymer surrounding on the nanocluster platinum only influence FF a little; due to the better catalytic effect compared with that of the conventional sputtered electrode, the $V_{OC}$ and $I_{SC}$ of the cells made of counter electrode in Example 1 are higher than the ones made of sputtered electrodes. When the polymer content increases (such as in Examples 2 and 3), the catalytic effects of PVP-capped Pt nanoclusters decrease and the internal resistances of the cells increase due to excess of polymer. Therefore, the catalytic effect may be influenced by the PVP chains surrounding on the Pt nanoclusters.

TABLE 1

| Counter electrodes | $V_{OC}$ (V) | $I_{SC}$ (mA/cm$^2$) | FF | ηeff (%) |
|---|---|---|---|---|
| Example1: PVP/Pt = 1.1 | 0.69 | 11.8 | 0.53 | 4.32 |
| Example2: PVP/Pt = 5.9 | 0.66 | 11.2 | 0.50 | 3.69 |
| Example3: PVP/Pt = 23 | 0.67 | 10.6 | 0.41 | 2.92 |
| 100 nm sputtered Pt | 0.67 | 11.6 | 0.58 | 4.55 |

The comparison of the performances among different counter electrodes in DSSC is shown in Table 2, in which the reference 1 is reported by Hauch et al. (Electrochimi. Acta, 2001, 46, pp 3457), entitled "Diffusion in the electrolyte and charge-transfer reaction at the platinum electrode in dye-sensitized solar cells", wherein the preparing condition thereof is identical to the Comparative Example 1 except the sputtered Pt thickness is 3 nm. From Table 2, the electrode according to the present invention (Example 2) shows an acceptable catalytic effect at low Pt loading. The main advantage of this method is that the production steps are carried out under ambient conditions. Hence mass production will be much easier and less expensive than processes that require a high degree of vacuum.

TABLE 2

| Types of Pt electrodes | Pt loading ($\mu g/cm^2$) | $R_{CT}$ ($\Omega cm^2$) | Solvent | Highest preparation temperature (° C.) |
|---|---|---|---|---|
| Example 2 | 4.89 | 5.66 | MPN | Room Temperature |
| Thermal Cluster Pt | 5 | <1 | NMO | 380 |
| Reference 1 | 6.44 | 57 | MPN | Depending on sputtering time |
| Comparative Example 1 | ~200 | 10.8 | MPN | Depending on sputtering time |

INDUSTRIAL APPLICABILITY

As can be seen from the foregoing, the method for forming an electrode according to the present invention comprises an electrochemical catalyst layer formed by polymer-capped noble metal nanoclusters, which reduces the amount of noble metal used in the electrochemical device and is suitable for mass production.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for preparing an electrode having an Electrochemical catalyst layer, comprising the steps of:
    providing a substrate having a conductive layer thereon;
    immersing the substrate in a first solution having a conditioner to form a conditioner layer on the surface of the conductive layer; and
    immersing the substrate in a second solution having polymer-capped noble metal nanoclusters dispersed therein, wherein the conditioner layer on the substrate attracts the polymer-capped noble metal nanoclusters to form a polymer-protected electrochemical catalyst layer on the conditioner layer of the substrate.

2. The method according to claim 1, wherein the conductive layer is made of ITO glass.

3. The method according to claim 1 wherein the conductive layer is nickel or stainless steel.

4. The method according to claim 1, wherein the polymer is selected from the group consisting of PVP, poly(acrylamide) (PAM), poly(vinyl alcohol) (PVAL), poly(acrylic acid) (PAA), and poly(ethyleneimine) (PEI).

5. The method according to claim 1, wherein the noble metal is selected from the group consisting of palladium, platinum, ruthenium, silver, and gold.

6. The method according to claim 1, wherein a method for preparing the second solution comprising:
    providing a polymer solution capable of capping the noble metal;
    adding a precursor of a noble metal salt into the polymer solution; and
    adding a reductant into the polymer solution having the noble metal salt to make the precursors reduced to the noble metal particles.

7. The method according to claim 1, wherein the conditioner is a cationic surfactant.

8. The method according to claim 1, wherein the ratio of weight of the polymer to the weight of the noble metal in the second solution is 0.5-6.

9. The method according to claim 1, wherein the size of the noble metal nanoclusters in the electrochemical catalyst layer is 10~50 nm.

10. The method according to claim 1, wherein the step of Immersing the substrate in the second solution is at a temperature lower than 50° C.

11. A method for manufacturing an electrochemical device with an electrode having an electrochemical catalyst layer, comprising the steps of:
    laminating a first electrode and a second electrode by a sealing layer, wherein at least one of the first electrode and the second electrode is formed by the following steps:
    providing a substrate having a conductive layer thereon, immersing the substrate in a first solution having a conditioner to form a conditioner layer on the surface of the conductive layer, and
    immersing the substrate in a second solution having polymer-capped noble metal nanoclusters dispersed therein, wherein the conditioner layer on the substrate attracts the polymer-capped noble metal nanoclusters to form a polymer-protected electrochemical catalyst layer on the conditioner layer of the substrate; and
    injecting an electrolyte into a gap between the first electrode and the second electrode through an inlet.

12. The method according to claim 11, wherein the electrochemical device is a dye-sensitized solar cell.

13. The method according to claim 12, wherein the second electrode includes a transparent conductive glass and a dye-impregnated $TiO_2$ layer formed on the surface of the transparent conductive glass when the first electrode is a cathode having an electrochemical catalyst layer.

14. The method according to claim 13, wherein the dye is represented by the following Formula 1, Formula 2, Formula 3, or Formula 4.

[Formula 1]

N3

[Formula 2]

N719

[Formula 3]

TBAOOC, COOTBA, NCS, Ru, NCS, TBAOOC, COOTBA

N712

[Formula 4]

Black Dye

15. The method according to claim 11, wherein the conductive layer is made of ITO glass.

16. The method according to claim 11, wherein the polymer is selected from the group consisting of PVP, poly(acrylamide) (PAM), poly(vinyl alcohol) (PVAL), poly(acrylic acid) (PAA), and poly(ethyleneimine) (PEI).

17. The method according to claim 11, wherein the noble metal is selected from the group consisting of palladium, platinum, ruthenium, silver, and gold.

18. The method according to claim 11, wherein the conditioner is a cationic surfactant.

19. The method according to claim 11, wherein the weight of the polymer to the weight of the noble metal in the second solution is 0.5-6.

20. The method according to claim 11, wherein the size of the noble metal nanoclusters in the electrochemical catalyst layer is 10~50 nm.

21. A method for preparing an electrode having an electrochemical catalyst layer, comprising the steps of:
    providing a substrate having a metal conductive layer thereon which is stainless steel or nickel;
    immersing the substrate in a first solution having a conditioner to form a conditioner layer on the surface of the conductive layer; and
    immersing the substrate in a second solution having polymer-capped noble metal nanoclusters dispersed therein, wherein the conditioner layer on the substrate attracts the polymer-capped noble metal nanoclusters to form a polymer-protected electrochemical catalyst layer on the conditioner layer of the substrate.

22. The method according to claim 11 wherein the conductive layer is made of graphite or a metal.

23. The method according to claim 1 wherein the conductive layer is made of graphite or a metal.

* * * * *